(12) United States Patent
Mattis et al.

(10) Patent No.: US 10,797,363 B2
(45) Date of Patent: Oct. 6, 2020

(54) METHOD FOR RECYCLING AND REFRESHING CATHODE MATERIAL, REFRESHED CATHODE MATERIAL AND LITHIUM ION BATTERY

(71) Applicant: Microvast Power Systems Co., Ltd., Zhejiang (CN)

(72) Inventors: Wenjuan Liu Mattis, Zhejiang (CN); Bryan T. Yonemoto, Clearwater, FL (US); Yuehui Yin, Zhejiang (CN); Xiangchao Kong, Zhejiang (CN); Xuelei Sun, Zhejiang (CN)

(73) Assignee: Microvast Power Systems Co., Ltd., Zhejiang (CN)

( * ) Notice: Subject to any disclaimer, the term of this patent is extended or adjusted under 35 U.S.C. 154(b) by 74 days.

(21) Appl. No.: 16/172,899

(22) Filed: Oct. 29, 2018

(65) Prior Publication Data
US 2019/0131673 A1 May 2, 2019

(30) Foreign Application Priority Data
Oct. 30, 2017 (CN) .......................... 2017 1 1036650

(51) Int. Cl.
*H01M 10/54* (2006.01)
*H01M 6/52* (2006.01)
(Continued)

(52) U.S. Cl.
CPC ........ *H01M 10/54* (2013.01); *C01G 45/1242* (2013.01); *C01G 53/50* (2013.01);
(Continued)

(58) Field of Classification Search
None
See application file for complete search history.

(56) References Cited

U.S. PATENT DOCUMENTS

2013/0302226 A1* 11/2013 Wang .................. H01M 4/52
423/50
2013/0312254 A1* 11/2013 Kim .................... H01M 4/131
29/623.1
(Continued)

FOREIGN PATENT DOCUMENTS

| CN | 103956533 A | 7/2014 |
|---|---|---|
| CN | 103956533 A | 3/2016 |
| EP | 2963708 A1 | 1/2016 |
| JP | 2004014405 A | 1/2004 |

OTHER PUBLICATIONS

Cheng Yan-Ping et al: "The recovery of lithium cobalt oxides from spent Li-ion batteries and its electrochemical performances", 2016 IEEE International Conference on Power and Renewable Energy (ICPRE), IEEE, Oct. 21, 2016 (Oct. 21, 2016), pp. 204-208.
(Continued)

*Primary Examiner* — Scott J. Chmielecki
(74) *Attorney, Agent, or Firm* — Gang Yu (57) ABSTRACT

Provided is a method for recycling and refreshing a cathode material, a refreshed cathode material and a lithium ion battery. The method for recycling and refreshing the cathode material includes: 1) a cathode material recycled from a waste battery is mixed with a manganiferous salt solution; 2) an alkali aqueous solution is added to the mixture to react to obtain a manganese hydroxide coating cathode material; and 3) the manganese hydroxide coating cathode material is sintered with a lithium resource to obtain a refreshed cathode material. The refreshed cathode material has no obvious impurity phase and has good crystallinity, high initial charge-discharge efficiency and good cycling performance.

18 Claims, 2 Drawing Sheets

(51) Int. Cl.
  *H01M 4/505* (2010.01)
  *H01M 10/0525* (2010.01)
  *H01M 4/131* (2010.01)
  *C01G 53/00* (2006.01)
  *H01M 4/525* (2010.01)
  *C01G 45/12* (2006.01)
  *H01M 4/36* (2006.01)
  *H01M 4/02* (2006.01)

(52) U.S. Cl.
  CPC ........... *H01M 4/131* (2013.01); *H01M 4/366* (2013.01); *H01M 4/505* (2013.01); *H01M 4/525* (2013.01); *H01M 6/52* (2013.01); *H01M 10/0525* (2013.01); *C01P 2002/72* (2013.01); *C01P 2004/03* (2013.01); *C01P 2004/61* (2013.01); *C01P 2004/84* (2013.01); *C01P 2006/40* (2013.01); *H01M 2004/028* (2013.01)

(56) References Cited

U.S. PATENT DOCUMENTS

2016/0126594 A1* 5/2016 Kodama ........... H01M 10/4235
  429/50
2017/0077564 A1* 3/2017 Wang .................... H01M 10/54

OTHER PUBLICATIONS

Supplemental EP Search Report dated Jan. 3, 2019 re: Application No. 18203309.2, pp. 1-10, citing: CN 103956533A; CN 105375079A;EP 2963708 A1; JP 2004014405 A and "The recovery of lithium cobalt oxides from spent Li-ion batteries and its electrochemical performances", 2016 IEEE International Conference on Power and Renewable Energy (ICPRE).

* cited by examiner

METHOD FOR RECYCLING AND REFRESHING CATHODE MATERIAL, REFRESHED CATHODE MATERIAL AND LITHIUM ION BATTERY

TECHNICAL FIELD

The present disclosure relates to a method for recycling and refreshing a cathode material, a refreshed cathode material and a lithium ion battery.

BACKGROUND

Along with rapid development of a new-energy vehicle industry, the usage of lithium ion batteries is increased and thus there emerge a great number of scrapped batteries. According to relevant data, it is expected that accumulated waste lithium batteries in China will exceed 12GWH and the scrappage will be greater than 170,000 tons by 2018. If these waste lithium batteries are handled improperly, metal elements such as nickel and cobalt in the cathode material of the lithium ion battery will cause pollution to the environment. Besides, the reserves of the metal elements such as lithium, nickel and cobalt in the cathode material in nature are not affluent and are expensive, so to recycle the cathode material is indispensable.

At present, methods for recycling the cathode material of the lithium ion battery mainly include thermometallurgy recycling and wet recycling. The thermometallurgy mainly refers to extract various metal elements in a metal compound via high temperature treatment and the method has a disadvantage of high energy consumption and high cost. The wet recycling mainly refers to a cathode material that is dissolved in an acid to obtain a salt solution containing a metal element, the salt solution is subjected to an impurity removal process so that a transition metal element in the salt solution is formed into a precursor, and the precursor is mixed with the lithium resource for calcining to regenerate the cathode material. The wet method consumes much more raw materials and has a long recycling period, a large energy consumption and a high cost. Through the analysis on the above two recycling methods, it is found that the current main recycling methods have the high cost and the recycled material cost is often higher than a material in normal production, and thus the positivity of an enterprise to recycle material is limited. Under such a circumstance, the development for recycling the cathode material of the lithium ion battery encounters a great obstacle.

SUMMARY

The present disclosure provides a method for recycling and refreshing a cathode material, which may include the following steps: 1) a cathode material recycled from a waste battery is mixed with a manganiferous inorganic aqueous solution to obtain a mixture; 2) an alkali aqueous solution is added into the mixture to react to obtain a manganese hydroxide coating cathode material; and 3) the manganese hydroxide coating cathode material is sintered with a lithium resource to obtain a refreshed cathode material, the refreshed cathode material being a lithium manganate coating cathode material.

What the meaning of the step 3 is that the manganese hydroxide coating cathode material is mixed with a lithium resource and then sintered to obtain a refreshed cathode material, the refreshed cathode material being a lithium manganate coating cathode material.

According to the battery-recycling preparation method provided by the present disclosure, the cost is low; and the refreshed cathode material has no obvious impurity phase and has good crystallinity, high initial charge-discharge efficiency and good cycling performance. In one embodiment, the impurity phase includes 0.01-0.13 wt. % of Na and 0.01-0.34 wt. % of Al.

In one embodiment, the average particle size of the cathode material recycled in the waste battery is 1.00 μm-16.00 μm. In another embodiment, the average particle size of the cathode material recycled in the waste battery is 4.00 μm-6.00 μm.

In still another embodiment, the average particle size of the cathode material recycled in the waste battery is 4.51 μm-5.12 μm.

In one embodiment, the average particle size of the manganese hydroxide coating cathode material is 1.00 μm-16.00 μm. In one embodiment, the average particle size of the manganese hydroxide coating cathode material is 4.00 μm-6.00 μm. In another embodiment, the average particle size of the manganese hydroxide coating cathode material is 4.81 μm-5.66 μm. In still another embodiment, the average particle size of the manganese hydroxide coating cathode material is 5.04 μm-5.45 μm. In the present disclosure, by adjusting the above parameter, a complete and effective manganese coating layer is formed on the surface of the recycled cathode material directly, which is beneficial to subsequent mixing with lithium; and therefore, the refreshed cathode material has no obvious impurity phase and has good crystallinity, high initial charge-discharge efficiency and good cycling performance.

In one embodiment, the thickness of a manganese hydroxide coating layer is 200 nm-500 nm. In another embodiment, the thickness of the manganese hydroxide coating layer is 300 nm-400 nm. In the present disclosure, by adjusting the above parameter, a complete and effective manganese coating layer is formed on the surface of the recycled cathode material directly, which is beneficial to subsequent mixing with lithium; and therefore, the refreshed cathode material has no obvious impurity phase and has good crystallinity, high initial charge-discharge efficiency and good cycling performance.

In one embodiment, the molar ratio of a manganese element in the cathode material recycled in the waste battery to a manganese element in the manganese hydroxide coating layer is 1:0.01-1:0.50. In another embodiment, the molar ratio of the manganese element in the cathode material recycled in the waste battery to the manganese element in the manganese hydroxide coating layer is 1:0.03-1:0.33. In still another embodiment, the molar ratio of the manganese element in the cathode material recycled in the waste battery to the manganese element in the manganese hydroxide coating layer is 1:0.10-1:0.20. In the present disclosure, by adjusting the above parameter, a complete and effective manganese coating layer is formed on the surface of the recycled cathode material directly, which is beneficial to subsequent mixing with lithium; and therefore, the refreshed cathode material has no obvious impurity phase and has good crystallinity, high initial charge-discharge efficiency and good cycling performance.

In one embodiment, the molar ratio of the manganese element in the manganiferous inorganic aqueous solution to the manganese element in the manganese hydroxide coating layer is 1:0.80-1:0.10. In another embodiment, the molar ratio of the manganese element in the manganiferous inorganic aqueous solution to the manganese element in the manganese hydroxide coating layer is 1:0.86-1:0.99. In still another embodiment, the molar ratio of the manganese element in the manganiferous inorganic aqueous solution to the manganese element in the manganese hydroxide coating layer is 1:0.92-1:0.99. In the present disclosure, by adjusting the above parameter, a complete and effective manganese coating layer is formed on the surface of the recycled cathode material directly, which is beneficial to subsequent mixing with lithium; and therefore, the refreshed cathode material has no obvious impurity phase and has good crystallinity, high initial charge-discharge efficiency and good cycling performance.

The method for recycling the cathode material in the waste battery is not limited in the present disclosure and the cathode material may be recycled using a conventional art. In one embodiment, said method for recycling the cathode material in the waste battery may comprise the following steps: the waste battery is disassembled to obtain a positive electrode; then, the positive electrode is soaked by a solvent to obtain cathode powder; and then, the cathode powder is calcined.

In another embodiment, said method for recycling the cathode material in the waste battery may comprise the following steps: the waste battery is disassembled to obtain a positive electrode; then, the positive electrode is soaked by a solvent to obtain cathode powder; and then, the cathode powder is calcined in an atmosphere.

In one embodiment, the manganiferous inorganic aqueous solution in the step 1) is at least one of a manganese sulfate aqueous solution, a manganese acetate aqueous solution and a manganese chloride aqueous solution. In another embodiment, the manganiferous inorganic aqueous solution in the step 1) is the manganese sulfate aqueous solution. In the present disclosure, by employing a solution form of the manganese, the manganese is mixed with the cathode material more uniformly, and the obtained refreshed cathode material has good crystallinity. In one embodiment, a concentration of manganese ions in the manganiferous inorganic aqueous solution in the step 1) is 0.1 mol/L-2 mol/L. In another embodiment, the concentration of manganese ions in the manganiferous inorganic aqueous solution in the step 1) is 0.5 mol/L-2 mol/L.

In the present disclosure, when a concentration of the manganiferous inorganic aqueous solution is too high, the reaction speed between the manganiferous aqueous solution and the alkali aqueous solution is too fast, thereby resulting in the manganese hydroxide coating not being uniform on the cathode material. When the concentration of the manganiferous inorganic aqueous solution is too low, the reaction speed between the manganiferous aqueous solution and the alkali aqueous solution is too slow and thus the coverage of the manganese hydroxide coating onto the cathode material is poor and the cycling performance of the obtained cathode material is poor.

In one embodiment, the molar ratio of the cathode material to the manganese element in the step 1) is 1:0.01-1:0.10. In another embodiment, the molar ratio of the cathode material and the manganese element in the step 1) is 1:0.01-1:0.08. In the present disclosure, when the molar ratio of the cathode material to the manganese element is too high, that is, the content of the manganese element is too small, the few manganese element cannot take the coating effect; and when the molar ratio of the cathode material to the manganese element is too low, that is the content of the manganese element is too large, the refreshed cathode material has too large granularity and thus the charge-discharge properties of the cathode material are reduced.

In one embodiment, in step 2), the alkali aqueous solution is dripped into the mixture to react and a pH value of a reaction system is adjusted to 10-13 to obtain the manganese hydroxide coating cathode material.

In another embodiment, in step 2), the alkali aqueous solution is dripped into the mixture to react and aging is performed after the reaction to obtain the manganese hydroxide coating cathode material.

In still another embodiment, in step 2), the alkali aqueous solution is dripped into the mixture to react and aging, filtering and, drying are performed after the reaction to obtain the manganese hydroxide coating cathode material.

In one embodiment, an aging time is 1 h-8 h. In another embodiment, the aging time is 2 h-6 h. In the present disclosure, the preferred aging time can guarantee that the order of the manganese hydroxide coating layer is kept good.

In one embodiment, in step 2), the alkali is selected from sodium hydroxide, potassium hydroxide or lithium hydroxide. In another embodiment, in step 2), the alkali is sodium hydroxide.

In one embodiment, in step 2), a concentration of the alkali aqueous solution is 0.01 mol/L-2.00 mol/L. In another embodiment, in step 2), the concentration of the alkali aqueous solution is 0.30 mol/L-1.00 mol/L.

In the present disclosure, when the concentration of the alkali aqueous solution is too high, the reaction speed between the manganiferous aqueous solution and the alkali aqueous solution is too fast, thereby resulting in that the manganese hydroxide is coated non-uniformly. When the concentration of the alkali aqueous solution is too low, the reaction speed between the manganiferous aqueous solution and the alkali aqueous solution is too slow and thus the tightness of the manganese hydroxide coating cathode material is poor and the cycling performance of the obtained cathode material is poor.

In one embodiment, the drying temperature is 80° C.-150° C. In another embodiment, the drying temperature is 100° C.-150° C.

In one embodiment, the drying time is 1 h-6 h. In another embodiment, the drying time is 4 h-6 h.

In one embodiment, in step 2), the reaction time is 2 h-8 h. In another embodiment, in step 2), the reaction time is 4 h-8 h.

As an embodiment, in step 3), the lithium resource is selected from lithium hydroxide, lithium carbonate, or a mixture of lithium hydroxide and lithium carbonate.

In one embodiment, in step 3), the mass ratio of the manganese hydroxide coating cathode material to the lithium resource is 1:0.04-1:0.30. In another embodiment, in step 3), the mass ratio of the manganese hydroxide coating cathode material to the lithium resource is 1:0.10-1:0.25. In the present disclosure, the preferred mole of the lithium resource can better supplement the lithium element lacked in the cathode material of the present disclosure and thus the crystallinity of the refreshed cathode material is improved.

In one embodiment, in step 3), the manganese hydroxide coating cathode material and the lithium resource are mixed for ball milling and are sintered to obtain the refreshed cathode material.

In one embodiment, in step 3), the manganese hydroxide coating cathode material and the lithium resource are mixed for ball milling and then are sintered in an atmosphere to obtain the refreshed cathode material.

In one embodiment, the ball milling is planetary ball milling or roller ball milling.

In one embodiment, the rotational speed in the ball milling is 200 r/min-600 r/min.

In another embodiment, the rotational speed in the ball milling is 300 r/min-500 r/min.

In one embodiment, the time for the ball milling is 20 min-180 min.

In another embodiment, the time for the ball milling is 40 min-90 min.

In the present disclosure, with the mutual cooperation of the preferred ball milling speed and ball milling time, the manganese hydroxide coating cathode material and the lithium resource are well mixed.

In one embodiment, in step 3), the sintering temperature is 700° C.-1000° C. In another embodiment, in step 3), the sintering temperature is 800° C.-950° C.

In one embodiment, in step 3), the sintering time is 6 h-20 h. In another embodiment, in step 3), the sintering time is 8 h-15 h.

As an embodiment, the cathode material is lithium nickel-cobalt-manganese oxide, lithium manganate, or a mixture of lithium nickel-cobalt-manganese oxide and lithium manganate. In another embodiment, the cathode material is the lithium nickel-cobalt-manganese oxide. In another embodiment, the cathode material is lithium-nickel-cobalt-manganese-aluminum oxide. In still another embodiment, the cathode material is at least one of lithium-nickel-cobalt oxide, lithium-nickel-manganese oxide or lithium-nickel-cobalt-aluminum oxide.

In one embodiment, the atmosphere is oxygen or air. In an embodiment, the positive electrode includes the cathode powder and a current collector.

In the present disclosure, the cathode powder is from the recycled battery and includes a cathode active material and an additive. In an embodiment, the cathode powder includes the cathode active material, a conductive additive and an adhesive.

In one embodiment, the solvent is selected from sodium hydroxide aqueous solution, potassium hydroxide aqueous solution, lithium hydroxide aqueous solution or N-methyl-2-pyrrolidone (NMP).

In one embodiment, a concentration of the sodium hydroxide aqueous solution is 0.1 mol/L-2.0 mol/L; a concentration of the potassium hydroxide aqueous solution is 0.1 mol/L-2.0 mol/L; and a concentration of the lithium hydroxide aqueous solution is 0.1 mol/L-2.0 mol/L.

In another embodiment, the concentration of the sodium hydroxide aqueous solution is 0.5 mol/L-1.0 mol/L; the concentration of the potassium hydroxide aqueous solution is 0.5 mol/L-1.0 mol/L; and the concentration of the lithium hydroxide aqueous solution is 0.5 mol/L-1.0 mol/L.

In one embodiment, the solvent is selected from the sodium hydroxide aqueous solution or the NMP.

In one embodiment, the positive electrode is soaked by the sodium hydroxide aqueous solution for 5 s-60 s, and the positive electrode is soaked by the NMP for 0.5 h-6.0 h.

In another embodiment, the positive electrode is soaked by the sodium hydroxide aqueous solution for 20 s-60 s, and the positive electrode is soaked by the NMP for 1 h-3 h.

In one embodiment, the mass ratio of the sodium hydroxide aqueous solution to the positive electrode is 20:1-1:1; and the mass ratio of the NMP to the positive electrode is 200:1-3:1.

In another embodiment, the mass ratio of the sodium hydroxide aqueous solution to the positive electrode is 13:1-8:1; and the mass ratio of the NMP to the positive electrode is 50:1-3:1.

In one embodiment, the calcination temperature is 400° C.-650° C. In another embodiment, the calcination temperature is 500° C.-650° C.

A refreshed cathode material, which may be refreshed with the above method.

A lithium ion battery, which may include a negative electrode, an electrolyte, a separator and the above-mentioned refreshed cathode material.

DETAILED DESCRIPTION OF THE DRAWINGS

DETAILED DESCRIPTION OF THE EMBODIMENTS

The present disclosure will be described below in detail via the following specific embodiments. However, the present disclosure is not limited to the following embodiments.

Embodiment 1

A lithium nickel-cobalt-manganese oxide material recycled from a waste battery was mixed with a 1 mol/L manganese sulfate aqueous solution to obtain a mixture (the molar ratio of a lithium nickel-cobalt-manganese oxide cathode material to a manganese element in the manganese sulfate aqueous solution was 1:0.1); a 1 mol/L sodium hydroxide aqueous solution was added into the above mixture to react for 2 h and age for 4 h to obtain a manganese hydroxide coating cathode material; and the manganese hydroxide coating cathode material was sintered with lithium hydroxide for 8 h at 750° C. (the mass ratio of the manganese hydroxide coating cathode material to the lithium hydroxide was 1:0.17) to obtain a refreshed cathode material.

Battery assembly: the refreshed cathode material, a conductive carbon black and a Polyvinylidene Fluoride (PVDF) were prepared into a slurry at the mass ratio of 90:5:5; the slurry was coated on an aluminum foil; a lithium sheet was taken as a negative electrode and a Polypropylene-Polyethylene (PP-PE) composite separator was taken as a separator; and after electrolyte injection (an electrolyte was a non-aqueous electrolyte which was formed by adding an electrolyte salt $LiPF_6$ to an Ethylene Carbonate (EC), Diethyl Carbonate (DEC) and Dimethyl Carbonate (DMC) solvent, and in the electrolyte, the concentration of a lithium salt was 1.0 mol/L), a button battery was assembled.

Battery test: a capacity test was performed on the button battery, in which the charge-discharge voltages were 2.5V-4.3V. In this embodiment, the initial charge-discharge efficiency of the refreshed cathode material was 77.8%, the 0.2C specific discharge capacity was 152.6 mAh/g and after 100 cycles of 1C charge-discharge, the capacity retention ratio was 79.1%.

Embodiment 2

A waste battery was disassembled to obtain a positive electrode; then, the positive electrode was soaked by a 0.5 mol/L NMP aqueous solution for 6 h (the mass ratio of the NMP and the positive electrode was 200:1) to obtain cathode powder; and then, the cathode powder was calcined at 400° C. in an air atmosphere to obtain a cathode material (lithium nickel-cobalt-manganese oxide) of the waste battery, the average particle size of the cathode material of the waste battery being 4.60 μm.

The lithium nickel-cobalt-manganese oxide material recycled from the waste battery was mixed with a manganese sulfate aqueous solution (the concentration of a manganese ion was 0.5 mol/L) to obtain a mixture (the molar ratio of the lithium nickel-cobalt-manganese oxide cathode material to a manganese element was 1:0.05); a 0.5 mol/L sodium hydroxide aqueous solution was added to the above mixture to react for 4 h, the pH was adjusted to 13, the aging was performed for 4 h and the filtering was performed to obtain a manganese hydroxide coating cathode material; and the manganese hydroxide coating cathode material and the lithium hydroxide were mixed, were subjected to planetary ball milling (the rotational speed in the ball milling was 400 r/min and the ball milling was for 90 min) and were sintered in the air atmosphere for 8 h at 820° C. (the mass ratio of the manganese hydroxide coating cathode material to the lithium hydroxide was 1:0.17) to obtain a refreshed cathode material.

Figure 1:
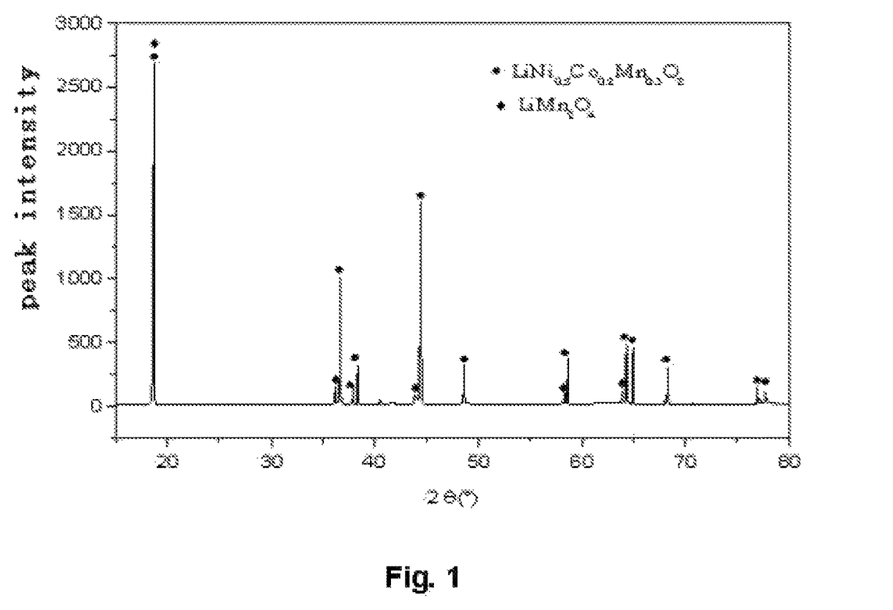
FIG. 1 is an X-Ray Diffraction (XRD) map of a refreshed cathode material in a second embodiment.

It may be seen from an XRD map in FIG. 1 that the refreshed cathode material contains diffraction peaks of the lithium nickel-cobalt-manganese oxide and the lithium manganate and the lithium manganate is coated on the surface of the refreshed cathode material. Furthermore, it may be seen from the XRD map that the refreshed cathode material has serious lithium-nickel mixing and the crystallinity of the refreshed cathode material is good.

Figure 2:
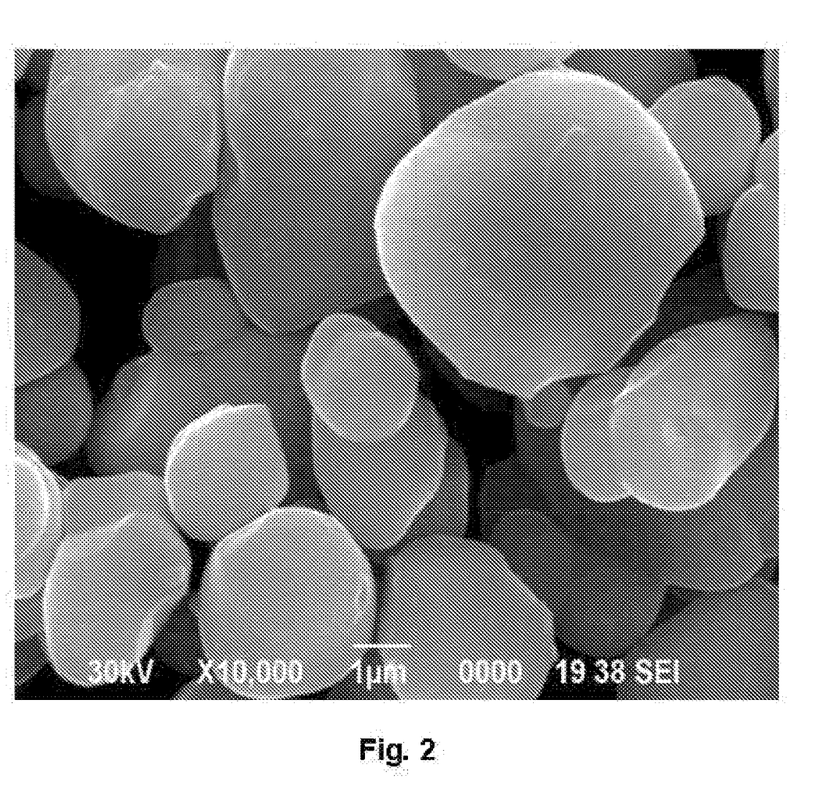
FIG. 2 is a Scanning Electron Microscopy (SEM) map of a cathode material in a in a second embodiment.
Figure 3:
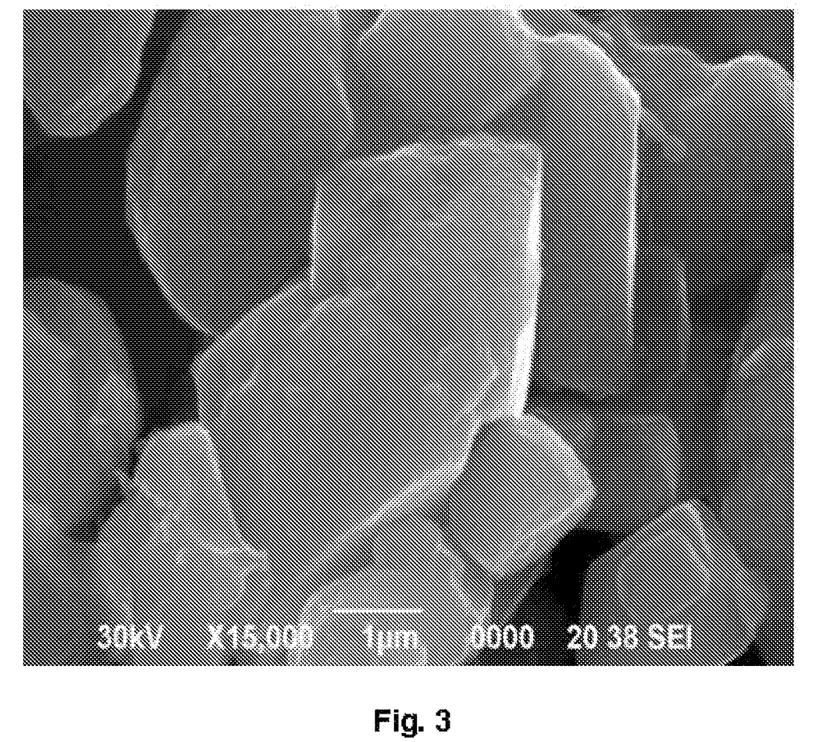
FIG. 3 is an XRD map of a refreshed cathode material in a second embodiment.

It may be observed from the comparison in FIG. 2 and FIG. 3 that the refreshed cathode material in this embodiment is slightly coarser than a cathode material, and a coating layer tightly integrated with original particles is formed after the refreshed cathode material was doped with the manganese and was sintered in this embodiment.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 86.8%, the 0.2C specific discharge capacity was 159.6 mAh/g and after 100 cycles of 1C charge-discharge, the capacity retention ratio was 89.1%.

In this embodiment, the battery assembly process of the cathode material (which is recycled and unrefreshed) was similar to the first embodiment; and the battery test was performed on the button battery, in which the charge-discharge voltages were 2.5V-4.3V. In this embodiment, the 0.2C specific discharge capacity of the cathode material was 140.7 mAh/g and after 100 cycles of 1C charge-discharge, the capacity retention ratio was 69.1%.

From the above, the specific capacity and the capacity retention ratio of the refreshed cathode material all are obviously higher than those of the cathode material in this embodiment.

Embodiment 3

A waste battery was disassembled to obtain a positive electrode; then, the positive electrode was soaked by a 0.5 mol/L sodium hydroxide aqueous solution for 30 s (the mass ratio of the sodium hydroxide and the positive electrode was 20:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 1 mol/L) to obtain a mixture (the molar ratio of a lithium nickel-cobalt-manganese oxide cathode material to a manganese element was 1:0.08); a 0.5 mol/L sodium hydroxide aqueous solution was added to the above mixture to react for 2 h, the pH was adjusted to 13, the aging was performed for 4 h and the filtering was performed to obtain a manganese hydroxide coating cathode material, the average particle size of the manganese hydroxide coating cathode material being 5.04 μm; and the manganese hydroxide coating cathode material and the lithium hydroxide were mixed, were subjected to roller ball milling (the rotational speed in the ball milling was 600 r/min and the ball milling was for 90 min) and were sintered in the air atmosphere for 8 h at 800° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 84.5%, the 0.2C specific discharge capacity was 155.0 mAh/g and after 100 cycles of 1C charge-discharge, the capacity retention ratio was 88.2%.

Embodiment 4

A waste battery was disassembled to obtain a positive electrode; then, the positive electrode was soaked by a 0.5 mol/L sodium hydroxide aqueous solution for 30 s (the mass ratio of the sodium hydroxide and the positive electrode was 20:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 0.5 mol/L) to obtain a mixture (the molar ratio of a lithium nickel-cobalt-manganese oxide cathode material to a manganese element was 1:0.05); a 0.5 mol/L sodium hydroxide aqueous solution was added to the above mixture to react for 4 h, age for 4 h, filter and dry for 1 h at 80° C. to obtain a manganese hydroxide coating cathode material, the thickness of a manganese hydroxide coating layer being 300 nm; and the manganese hydroxide coating cathode material and the lithium hydroxide were mixed, were subjected to planetary ball milling (the rotational speed in the ball milling was 200 r/min and the ball milling was for 20 min) and were sintered in the air atmosphere for 10 h at 820° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 80.1%, the 0.2C specific discharge capacity was 146.6 mAh/g and after 100 cycles of 1C charge-discharge, the capacity retention ratio was 76.6%.

Embodiment 5

A waste battery was disassembled to obtain a positive electrode; then, the positive electrode was soaked by a 0.5 mol/L sodium hydroxide aqueous solution for 30 s (the mass ratio of the sodium hydroxide and the positive electrode was 20:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese acetate aqueous solution (the concentration of a manganese ion was 1 mol/L) to obtain a mixture (the molar ratio of a lithium nickel-cobalt-manganese oxide cathode material to a manganese element was 1:0.08); a 0.5 mol/L sodium hydroxide aqueous solution was added to the above mixture to react for 2 h and the pH was adjusted to 12 to obtain a manganese hydroxide coating cathode material, the molar ratio of a manganese element in the cathode material recycled from the waste battery to a manganese element in a manganese hydroxide coating layer being 1:0.10; and the manganese hydroxide coating cathode material and the lithium hydroxide were mixed, were subjected to planetary ball milling (the rotational speed in the ball milling was 400 r/min and the ball milling was for 90 min) and were sintered in the air atmosphere for 8 h at 750° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 79.2%, the 0.2C specific discharge capacity was 146.5 mAh/g and after 100 cycles of 1C charge-discharge, the capacity retention ratio was 67.4%.

Embodiment 6

A waste battery was disassembled to obtain a positive electrode; then, the positive electrode was soaked by a 0.5 mol/L sodium hydroxide aqueous solution for 30 s (the mass ratio of the sodium hydroxide and the positive electrode was 20:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 0.1 mol/L) to obtain a mixture (the molar ratio of a lithium nickel-cobalt-manganese oxide cathode material to a manganese element was 1:0.08); a 0.5 mol/L sodium hydroxide aqueous solution was added to the above mixture to react for 2 h and the pH was adjusted to 13 to obtain a manganese hydroxide coating cathode material, the molar ratio of a manganese element in the manganiferous inorganic aqueous solution to a manganese element in a manganese hydroxide coating layer being 1:0.92; and the manganese hydroxide coating cathode material and the lithium hydroxide were mixed, were subjected to roller ball milling (the rotational speed in the ball milling was 400 r/min and the ball milling was for 90 min) and were sintered in the air atmosphere for 10 h at 850° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 83.2%, the 0.2C specific discharge capacity was 151.5 mAh/g and after 100 cycles of 1C charge-discharge, the capacity retention ratio was 86.3%.

Embodiment 7

A waste battery was disassembled to obtain a positive electrode; then, the positive electrode was soaked by a 0.5 mol/L sodium hydroxide aqueous solution for 30 s (the mass ratio of the sodium hydroxide and the positive electrode was 20:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 2 mol/L) to obtain a mixture (the molar ratio of a lithium nickel-cobalt-manganese oxide cathode material to a manganese element was 1:0.08); a 0.5 mol/L sodium hydroxide aqueous solution was added to the above mixture to react for 2 h and the pH was adjusted to 13 to obtain a manganese hydroxide coating cathode material; and the manganese hydroxide coating cathode material and the lithium hydroxide were mixed, were subjected to planetary ball milling (the rotational speed in the ball milling was 400 r/min and the ball milling was for 90 min) and were sintered in the air atmosphere for 10 h at 850° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 83.6%, the 0.2C specific discharge capacity was 144.2 mAh/g and after 100 cycles of 1C charge-discharge, the capacity retention ratio was 66.5%.

Embodiment 8

A waste battery was disassembled to obtain a positive electrode; then, the positive electrode was soaked by a 0.5 mol/L sodium hydroxide aqueous solution for 6 h (the mass ratio of the sodium hydroxide and the positive electrode was 200:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 0.5 mol/L) to obtain a mixture (the molar ratio of a lithium nickel-cobalt-manganese oxide cathode material to a manganese element was 1:0.01); a 0.5 mol/L sodium hydroxide aqueous solution was added to the above mixture to react for 4 h and the pH was adjusted to 13 to obtain a manganese hydroxide coating cathode material; and the manganese hydroxide coating cathode material and the lithium hydroxide were mixed, were subjected to planetary ball milling (the rotational speed in the ball milling was 400 r/min and the ball milling was for 90 min) and were sintered in the air atmosphere for 8 h at 820° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 86.2%, the 0.2C specific discharge capacity was 151.7 mAh/g and after 100 cycles of 1C charge-discharge, the capacity retention ratio was 82.6%.

Embodiment 9

A waste battery was disassembled to obtain a positive electrode; then, the positive electrode was soaked by a 0.5 mol/L sodium hydroxide aqueous solution for 6 h (the mass ratio of the sodium hydroxide and the positive electrode was 200:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 0.5 mol/L) to obtain a mixture (the molar ratio of a lithium nickel-cobalt-manganese oxide cathode material to a manganese element was 1:0.08); a 0.5 mol/L sodium hydroxide aqueous solution was added to the above mixture to react for 4 h and the pH was adjusted to 13 to obtain a manganese hydroxide coating cathode material; and the manganese hydroxide coating cathode material and the lithium hydroxide were mixed, were subjected to planetary ball milling (the rotational speed in the ball milling was 400 r/min and the ball milling was for 90 min) and were sintered in the air atmosphere for 8 h at 820° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 81.2%, the 0.2C specific discharge capacity was 145.3 mAh/g and after 100 cycles of 1C charge-discharge, the capacity retention ratio was 83.3%.

Embodiment 10

A waste battery was disassembled to obtain a positive electrode; then, the positive electrode was soaked by a 0.5 mol/L sodium hydroxide aqueous solution for 6 h (the mass ratio of the sodium hydroxide and the positive electrode was 200:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 0.5 mol/L) to obtain a mixture (the molar ratio of a lithium nickel-cobalt-manganese oxide cathode material to a manganese element was 1:0.05); a 0.3 mol/L sodium hydroxide aqueous solution was added to the above mixture to react for 4 h and the pH was adjusted to 13 to obtain a manganese hydroxide coating cathode material; and the manganese hydroxide coating cathode material and the lithium hydroxide were mixed, were subjected to planetary ball milling (the rotational speed in the ball milling was 400 r/min and the ball milling was for 90 min) and were sintered in the air atmosphere for 8 h at 820° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 87.2%, the 0.2C specific discharge capacity was 153.3 mAh/g and after 100 cycles of 1C charge-discharge, the capacity retention ratio was 87.8%.

Embodiment 11

A waste battery was disassembled to obtain a positive electrode; then, the positive electrode was soaked by a 0.5 mol/L sodium hydroxide aqueous solution for 6 h (the mass ratio of the sodium hydroxide and the positive electrode was 200:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 0.5 mol/L) to obtain a mixture (the molar ratio of a lithium nickel-cobalt-manganese oxide cathode material to a manganese element was 1:0.05); a 1 mol/L sodium hydroxide aqueous solution was added to the above mixture to react for 4 h and the pH was adjusted to 13 to obtain a manganese hydroxide coating cathode material; and the manganese hydroxide coating cathode material and the lithium hydroxide were mixed, were subjected to planetary ball milling (the rotational speed in the ball milling was 400 r/min and the ball milling was for 90 min) and were sintered in the air atmosphere for 8 h at 820° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge, voltages were 2.5V-4.3V. In this embodiment, the initial charge-discharge efficiency of the refreshed cathode material was 83.9%, the 0.2C specific discharge capacity was 146.6 mAh/g and after 100 cycles of 1C charge-discharge, the capacity retention ratio was 77.3%.

Embodiment 12

A waste battery was disassembled to obtain a positive electrode; then, the positive electrode was soaked by a 0.5 mol/L sodium hydroxide aqueous solution for 6 h (the mass ratio of the sodium hydroxide and the positive electrode was 200:1) to obtain cathode powder; and then, the, cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 0.5 mol/L) to obtain a mixture (the molar ratio of a lithium nickel-cobalt-manganese oxide cathode material to a manganese element was 1:0.05); a 1 mol/L sodium hydroxide aqueous solution was added to the above mixture to react for 4 h, the pH was adjusted to 13 and after completing reaction, the aging by standing was performed for 1 h to obtain a manganese hydroxide coating cathode material; and the manganese hydroxide coating cathode material and the lithium hydroxide were mixed, were subjected to planetary ball milling (the rotational speed in the ball milling was 400 r/min and the ball milling was for 90 min) and were sintered in the air atmosphere for 8 h at 820° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 82.9%, the 0.2C specific discharge capacity was 146.7 mAh/g and after 100 cycles of 1C charge-discharge, the capacity retention ratio was 79.3%.

Embodiment 13

A waste battery was disassembled to obtain a positive electrode; then, the positive electrode was soaked by a 0.5 mol/L sodium hydroxide aqueous solution for 6 h (the mass ratio of the sodium hydroxide and the positive electrode was 200:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 0.5 mol/L) to obtain a mixture (the molar ratio of a lithium nickel-cobalt-manganese oxide cathode material to a manganese element was 1:0.05); a 1 mol/L sodium hydroxide aqueous solution was added to the above mixture to react for 4 h, the pH was adjusted to 13 and after completing reaction, the aging by standing was performed for 8 h to obtain a manganese hydroxide coating cathode material; and the manganese hydroxide coating cathode material and the lithium hydroxide were mixed, were subjected to planetary ball milling (the rotational speed in the ball milling was 400 r/min and the ball milling was for 90 min) and were sintered in the air atmosphere for 8 h at 820° C. (the mass ratio of the manganese hydroxide coating cathode material to the lithium hydroxide was 1:0.17) to obtain a refreshed cathode, material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 87.9%, the 0.2C specific discharge capacity was 154.7 mAh/g and after 100 cycles of 1C charge-discharge, the capacity retention ratio was 88.9%.

Embodiment 14

A waste battery was disassembled to obtain a positive electrode; then, the positive electrode was soaked by a 0.5 mol/L sodium hydroxide aqueous solution for 6 h (the mass ratio of the sodium hydroxide and the positive electrode was 200:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 0.5 mol/L) to obtain a mixture (the molar ratio of a lithium nickel-cobalt-manganese oxide cathode material to a manganese element was 1:0.05); a 1 mol/L sodium hydroxide aqueous solution was added to the above mixture to react for 4 h, the pH was adjusted to 13 and after completing reaction, the aging by standing was performed for 4 h to obtain a manganese hydroxide coating cathode material; and the manganese hydroxide coating cathode material and the lithium hydroxide were mixed, were subjected to planetary ball milling (the rotational speed in the ball milling was 400 r/min and the ball milling was for 90 min) and were sintered in the air atmosphere for 8 h at 820° C. (the mass ratio of the manganese hydroxide coating cathode material to the lithium hydroxide was 1:0.06) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 82.5%, the 0.2C specific discharge capacity was 143.1 mAh/g and after 100 cycles of 1C charge-discharge, the capacity retention ratio was 67.1%.

Embodiment 15

A waste battery was disassembled to obtain a positive electrode; then, the positive electrode was soaked by a 0.5 mol/L sodium hydroxide aqueous solution for 6 h (the mass ratio of the sodium hydroxide and the positive electrode was 200:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 0.5 mol/L) to obtain a mixture (the molar ratio of a lithium nickel-cobalt-manganese oxide cathode material to a manganese element was 1:0.05); a 1 mol/L sodium hydroxide aqueous solution was added to the above mixture to react for 4 h, the pH was adjusted to 13 and after completing reaction, the aging by standing was performed for 4 h to obtain a manganese hydroxide coating cathode material; and the manganese hydroxide coating cathode material and the lithium hydroxide were mixed, were subjected to planetary ball milling (the rotational speed in the ball milling was 400 r/min and the ball milling was for 90 min) and were sintered in the air atmosphere for 8 h at 820° C. (the mass ratio of the manganese hydroxide coating cathode material to the lithium hydroxide was 1:0.25) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 86.6%, the 0.2C specific discharge capacity was 150.3 mAh/g and after 100 cycles of 1C charge-discharge, the capacity retention ratio was 82.3%.

Embodiment 16

A waste battery was disassembled to obtain a positive electrode; then, the positive electrode was soaked by a 0.5 mol/L sodium hydroxide aqueous solution for 6 h (the mass ratio of the sodium hydroxide and the positive electrode was 200:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 0.5 mol/L) to obtain a mixture (the molar ratio of a lithium nickel-cobalt-manganese oxide cathode material to a manganese element was 1:0.05); a 1 mol/L sodium hydroxide aqueous solution was added to the above mixture to react for 4 h, the pH was adjusted to 13 and after completing reaction, the aging by standing was performed for 4 h to obtain a manganese hydroxide coating cathode material; and the manganese hydroxide coating cathode material and the lithium hydroxide were mixed, were subjected to planetary ball milling (the rotational speed in the ball milling was 300 r/min and the ball milling was for 60 min) and were sintered in the air atmosphere for 8 h at 820° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 82.6%, the 0.2C specific discharge capacity was 147.3 mAh/g and after 100 cycles of 1C charge-discharge, the capacity retention ratio was 80.1%.

Embodiment 17

A waste battery was disassembled to obtain a positive electrode; then, the positive electrode was soaked by a 0.5 mol/L sodium hydroxide aqueous solution for 6 h (the mass ratio of the sodium hydroxide and the positive electrode was 200:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 0.5 mol/L) to obtain a mixture (the molar ratio of a lithium nickel-cobalt-manganese oxide cathode material to a manganese element was 1:0.05); a 1 mol/L sodium hydroxide aqueous solution was added to the above mixture to react for 4 h, the pH was adjusted to 13 and after completing reaction, the aging by standing was performed for 4 h to obtain a manganese hydroxide coating cathode material; and the manganese hydroxide coating cathode material and the lithium hydroxide were mixed, were subjected to planetary ball milling (the rotational speed in the ball milling was 500 r/min and the ball milling was for 60 min) and were sintered in the air atmosphere for 8 h at 820° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 86.8%, the 0.2C specific discharge capacity was 155.3 mAh/g and after 100 cycles of 1C charge-discharge, the capacity retention ratio was 89.3%.

Embodiment 18

A waste battery was disassembled to obtain a positive electrode; then, the positive electrode was soaked by a 0.5 mol/L sodium hydroxide aqueous solution for 6 h (the mass ratio of the sodium hydroxide and the positive electrode was 200:1) to obtain cathode powder; and then, the cathode powder was calcined at 400° C. in an air atmosphere to obtain a cathode material of the waste battery.

A lithium nickel-cobalt-manganese oxide, material recycled from the waste battery was mixed with a manganese sulfate aqueous solution (the concentration of a manganese ion was 0.5 mol/L) to obtain a mixture (the molar ratio of a lithium nickel-cobalt-manganese oxide cathode material to a manganese element was 1:0.05); a 1 mol/L sodium hydroxide aqueous solution was added to the above mixture to react for 4 h, the pH was adjusted to 13 and after completing reaction, the aging by standing was performed for 4 h to obtain a manganese hydroxide coating cathode material; and the manganese hydroxide coating cathode material and the lithium hydroxide were mixed, were subjected to planetary ball milling (the rotational speed in the ball milling was 400 r/min and the ball milling was for 30 min) and were sintered in the air atmosphere for 8 h at 820° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge, voltages were 2.5V-4.3V. In this embodiment, the initial charge-discharge efficiency of the refreshed cathode material was 83.6%, the 0.2C specific discharge capacity was 144.7 mAh/g and after 100 cycles of 1C charge-discharge, the capacity retention ratio was 80.1%.

Embodiment 19

A waste battery was disassembled to obtain a positive electrode; then, the positive electrode was soaked by a 0.5 mol/L sodium hydroxide aqueous solution for 6 h (the mass ratio of the sodium hydroxide and the positive electrode was 200:1) to obtain cathode powder; and then, the cathode powder was calcined at 400° C. in an air atmosphere to obtain a cathode material of the waste battery.

A lithium nickel-cobalt-manganese oxide material recycled from the waste battery was mixed with a manganese sulfate aqueous solution (the concentration of a manganese ion was 0.5 mol/L) to obtain a mixture (the molar ratio of a lithium nickel-cobalt-manganese oxide cathode material to a manganese element was 1:0.05); a 1 mol/L sodium hydroxide aqueous solution was added to the above mixture to react for 4 h, the pH was adjusted to 13 and after completing reaction, the aging by standing was performed for 4 h to obtain a manganese hydroxide coating cathode material; and the manganese hydroxide coating cathode material and the lithium hydroxide were mixed, were subjected to planetary ball milling (the rotational speed in the ball milling was 400 r/min and the ball milling was for 90 min) and were sintered in the air atmosphere for 8 h at 820° C. (the mass ratio of the manganese hydroxide coating cathode material to the lithium hydroxide was 1:0.17) to obtain a refreshed cathode material.

Battery assembly: same as the first embodiment.

Battery test: a capacity test was performed on the button battery, in which the charge-discharge voltages were 2.5V-4.3V. In this embodiment, the initial charge-discharge efficiency of the refreshed cathode material was 86.6%, the 0.2C specific discharge capacity was 154.3 mAh/g and after 100 cycles of 1C charge-discharge, the capacity retention ratio was 88.1%.

What is claimed is:

1. A method for recycling and refreshing a cathode material, comprising:
   1) mixing a cathode material recycled from a waste battery with a manganiferous inorganic aqueous solution to obtain a mixture, while the cathode material is lithium nickel-cobalt-manganese oxide, lithium manganate, or a mixture of lithium nickel-cobalt-manganese oxide and lithium manganate;
   2) adding an alkali aqueous solution into the mixture to react to obtain a manganese hydroxide coating cathode material; and
   3) sintering the manganese hydroxide coating cathode material with a lithium resource to obtain a refreshed cathode material.

2. The method as claimed in claim 1, wherein a step for recycling the cathode material from the waste battery comprises: disassembling the waste battery to obtain a positive electrode; then, soaking the positive electrode by a solvent to obtain cathode powder; and then, calcining the cathode powder.

3. The method as claimed in claim 1, wherein a concentration of manganese ions in the manganiferous inorganic aqueous solution in the step 1) is 0.1 mol/L-2.0 mol/L.

4. The method as claimed in claim 1, wherein a molar ratio of the cathode material to the manganese element in the step 1) is 1:0.01-1:0.10.

5. The method as claimed in claim 1, wherein in the step 2), the alkali aqueous solution is dripped to the mixture to react and a pH value of a reaction system is adjusted to 10-13 to obtain the manganese hydroxide coating cathode material.

6. The method as claimed in claim 1, wherein in the step 2), the alkali aqueous solution is dripped to the mixture to react, and after the reaction, aging is performed to obtain the manganese hydroxide coating cathode material.

7. The method as claimed in claim 1, wherein in the step 2), a concentration of the alkali aqueous solution is 0.01 mol/L-2.00 mol/L.

8. The method as claimed in claim 1, wherein in the step 2), a reaction time is 2 h-8 h.

9. The method as claimed in claim 1, wherein a mass ratio of the manganese hydroxide coating cathode material to the lithium resource is 1:0.04-1:0.30.

10. The method as claimed in claim 1, wherein in the step 3), the manganese hydroxide coating cathode material and the lithium resource are mixed for ball milling and are sintered to obtain the refreshed cathode material.

11. The method as claimed in claim 1, wherein in the step 3), a sintering temperature is 700° C.-1000° C.

12. The method as claimed in claim 1, wherein in the step 3), a sintering time is 6 h-20 h.

13. The method as claimed in claim 1, wherein the cathode material is lithium nickel-cobalt-manganese oxide, lithium manganate, or a mixture of lithium nickel-cobalt-manganese oxide and lithium manganate.

14. The method as claimed in claim 2, wherein the solvent is selected from a sodium hydroxide aqueous solution, a potassium hydroxide aqueous solution, a lithium hydroxide aqueous solution or an N-methyl-2-pyrrolidone.

15. The method as claimed in claim 14, wherein a concentration of the sodium hydroxide aqueous solution is 0.1 mol/L-2.0 mol/L; a concentration of the potassium hydroxide aqueous solution is 0.1 mol/L-2.0 mol/L; and a concentration of the lithium hydroxide aqueous solution is 0.1 mol/L-2.0 mol/L.

16. The method as claimed in claim 14, wherein the positive electrode is soaked by the sodium hydroxide aqueous solution for 5 s-60 s, and the positive electrode is soaked by the N-methyl-2-pyrrolidone for 0.5 h-6.0 h.

17. The method as claimed in claim 14, wherein a mass ratio of the sodium hydroxide aqueous solution to the positive electrode is 20:1-1:1; and a mass ratio of the N-methyl-2-pyrrolidone to the positive electrode is 200:1-3:1.

18. The method as claimed in claim 2, wherein a calcination temperature is 400° C.-650° C.

* * * * *